(No Model.)
G. V. MONTGOMERY.
ROAD CART.
No. 422,057. Patented Feb. 25, 1890.
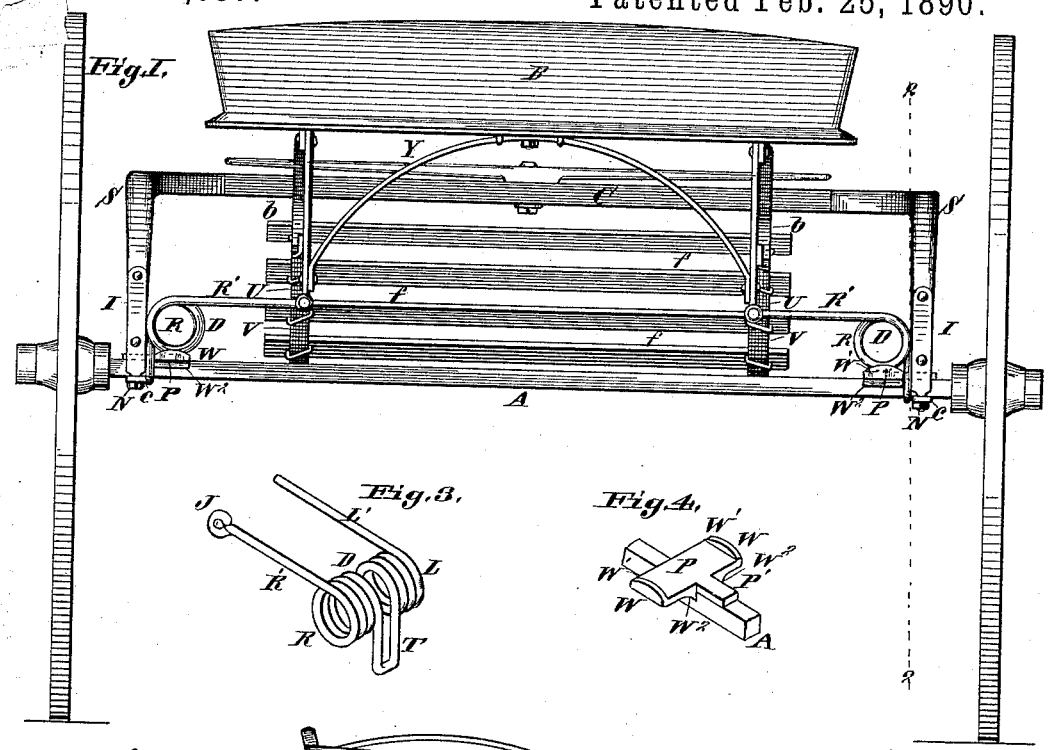
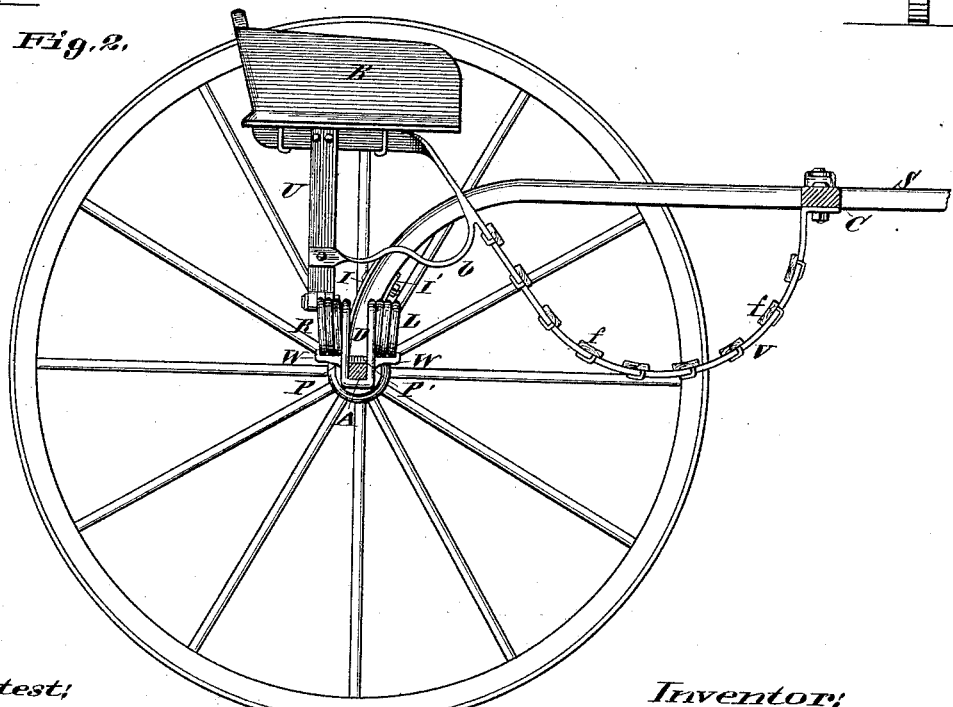
Attest:
Wm M Eccles
R. R. Sweet
Inventor:
George V. Montgomery.

UNITED STATES PATENT OFFICE.

GEORGE V. MONTGOMERY, OF AMSTERDAM, NEW YORK.

ROAD-CART.

SPECIFICATION forming part of Letters Patent No. 422,057, dated February 25, 1890.

Application filed January 4, 1890. Serial No. 335,895. (No model.)

*To all whom it may concern:*

Be it known that I, GEORGE V. MONTGOMERY, a citizen of the United States, and a resident of the city of Amsterdam, in the county of Montgomery, in the State of New York, have invented a new and useful Improvement in Road-Carts, of which the following is a specification.

My invention relates to improvement in road-carts; and it consists in the arrangement and combination of parts hereinafter described and claimed.

Figure 1 is a rear view of a cart containing my invention. Fig. 2 is a section in elevation, drawn on the line 2 2, Fig. 1. Fig. 3 is a view of the spring detached from the cart. Fig. 4 is a view of the plate which supports the spring and a part of the cart-axle. Fig. 5 is a detached view of a part of the foot-slats and seat-bar.

A is the axle of a road-cart, B is the seat, and S S are the shafts of the cart, which are all made in the ordinary way. The shafts S S are connected together by a cross-bar C in the usual manner, and have their rear ends clamped or otherwise secured to the axle A. In the drawings the shafts are attached to the axle by means of ordinary shaft-irons I I', which are secured to the under and upper sides of each shaft and pass down on each side of the axle and terminate in threaded ends, over which ends is placed a collar c, and which ends are provided with nuts N N.

P P are spring-plates, which consist of a flat piece of iron having one end P' made the width of the axle and the other end extending on both sides in wings W W, which wings are provided with upward-projecting flanges W' W' and with downward-projecting flanges $W^2 W^2$. The flanges $W^2 W^2$ are made to fit close against the sides of the axle, and their function is to prevent the iron from slipping laterally on the axle. The upward-projecting flanges W' W' are projections on the outer end and upper surface of the wings W W, and serve to engage the outer coils of the springs and prevent them from slipping off the spring-plates P. These spring-plates P are securely held on the top of the axle by the ends P', which pass under the ends of the shafts and between the shaft-irons I I' and under the ends of each shaft, respectively, when the nuts N N are screwed up tightly, bringing the end of the shaft down tightly on the top of the axle.

D D are two springs, one at the end of each shaft. These springs are provided with a right and a left coil, (designated by R and L, respectively,) each coil terminating in an extended arm R' and L'. The arm R' extends inwardly in about a horizontal direction from the top of the left coil and terminates in an eye J, by which it is pivotally connected to the standard U. The arm L' extends inwardly from the coil L and parallel with the arm R' and passes underneath the horizontal bar b, and about two inches beneath said bar when the cart is unloaded and in a normal position. These springs are each provided with arms R' and L'. Each spring has the inward coils extending down and around the axle between the wings W W and the ends of the shafts, forming loop T, which encircles the axle and prevents each coil from turning on the plates P.

V V are flat pieces of steel bent down to receive the foot-slats and up in front, terminating under the cross-bar C, where they are each securely bolted to it. These pieces receive a quarter-twist, so as to present their edges to the bottom of the seat, to which they are respectively secured by staples driven into the wood of the seat-bottom in the manner shown. At the rear end of each of these seat-bars V V is riveted or otherwise rigidly secured a vertical standard U, which extends downwardly and engages by a pivotal connection the end of the arm R' and serves to carry the rear end seat-bars on the arm R'.

To the upwardly-extending portion of each seat-bar is welded or otherwise permanently secured a brace b, which extends backward and is secured at its end to the standard U directly over the arms L'. This brace b has an upwardly-extending curve adapted to engage and prevent from slipping the arm L' near its end when the seat is depressed or the cart well loaded, and thus receive the resistance of the right-hand or inner coil of the spring.

The foot-slats f f f are each secured to the seat-bars V V by ordinary staples, which are driven into the wood of the seat, with their heads crossing the seat-bar in an oblique position, as shown. As there is a great strain at times on these seat-bars, I use this means of securing the seats to the seat-bars to avoid drilling, and thus weakening, the seat-bars, and also to avoid the great expense in drilling the holes in the bars.

Y is a circular brace fastened at each end to the standards U U and at its apex to the bottom of the seat, and serves to rigidly brace the standards U U.

It is perfectly obvious from the foregoing description that when the cart is loaded with a light load the left-hand coil R only is brought into action; but when it is heavily loaded the brace $b$ comes in contact with the arm L and the right-hand coil is brought into action and both are acted upon by the weight, and both coils are brought into action. Thus I have by use of this re-enforcing coil a spring that will ride as easily with two passengers as with one and as easy with one as with two.

Now what I claim, and for which I ask Letters Patent of the United States to be granted me, is—

1. In a road-cart, a spring consisting of two coils mounted upon a plate on the axle, the inner strand of each coil terminating in a loop, which loop surrounds the axle, and the outer strand of each coil terminating in an inwardly-extending arm, one pivotally connected to an upright standard carrying the seat and the other adapted to engage a horizontal curved brace as the seat descends with a heavy load, in combination with the seat and axle, substantially as described, and for the purposes set forth.

2. In a road-cart, a plate P, having outwardly-projecting wings W W, said wings being each provided with an upwardly-projecting flange W' on the upper side and on the lower side with a downwardly-projecting flange $W^2$, said upwardly-projecting flanges operating to hold the spring in place on the plate P and said downwardly-projecting flanges operating to retain the plate in position on the axle, in combination with the axle A, spring D, having coils R and L, and shaft S, substantially as set forth.

3. In a road-cart, the quarter-twisted seat-arms securely fastened to the bar C and the bottom of the seat and provided with the bent braces $b$, attaching them to the standards U U, said seat-arms being provided with wooden foot-slats secured thereto by staples, as shown, in combination with the seat, the standards U U, and circular brace Y, substantially as described, and for the purposes set forth.

4. In a road-cart, the springs D D, resting on the plate P and each having arms R and L, and composed of right and left coils, and being provided with a loop passing under the axle and uniting the two coils, one of said arms being pivotally connected to a standard supporting the seat of a cart and the other remaining free to engage a brace or stop on the seat-frame when the latter is depressed, in combination with said seat and axle of a road-cart, substantially as described, and for the purposes set forth.

5. In a road-cart, a spring securely connected to the axle and having right and left coils, each coil having an arm extending therefrom, one of said arms being adapted to be connected to the seat-supports and the other to remain free and adapted to come in contact with the seat-support as the seat descends, substantially as described, and for the purposes set forth.

6. A double-coiled spring provided with a loop made by extending the inner strands of the coils and two arms made by extending the outer strands of the respective coils, one arm being permanently engaged and the other free to be engaged alternately as the seat moves up and down, said spring being interposed between the running-gear and seat-support of a vehicle, in combination with said seat and running-gear, substantially as described.

GEORGE V. MONTGOMERY.

Attest:
WM. M. ECCLES,
R. R. SWEET.